United States Patent [19]

Yamada et al.

[11] Patent Number: 4,767,156

[45] Date of Patent: Aug. 30, 1988

[54] VEHICLE SEAT HEIGHT AND INCLINATION CONTROL APPARATUS

[75] Inventors: Yukifumi Yamada; Takami Terada, both of Toyota, Japan

[73] Assignee: Aisin Seiki Kabushiki Kaisha, Kariya, Japan

[21] Appl. No.: 30,599

[22] Filed: Mar. 27, 1987

[30] Foreign Application Priority Data

Mar. 31, 1986 [JP] Japan ................................. 61-73332

[51] Int. Cl.⁴ ............................................ A47C 1/025
[52] U.S. Cl. ................................. 297/313; 248/397; 248/394
[58] Field of Search ................... 297/313, 345, 346; 248/421, 396, 393, 394

[56] References Cited

U.S. PATENT DOCUMENTS

| | | | |
|---|---|---|---|
| 3,695,570 | 10/1972 | Ishida | 248/397 |
| 4,339,103 | 7/1982 | Mori et al. | 248/397 |
| 4,422,611 | 12/1983 | Kitsuda | 248/394 |
| 4,529,159 | 7/1985 | Terada et al. | 248/421 |
| 4,572,468 | 2/1986 | Lange et al. | 248/394 |
| 4,616,876 | 10/1986 | Suzuki et al. | 248/397 |
| 4,687,251 | 8/1987 | Kazaoka et al. | 248/397 |

FOREIGN PATENT DOCUMENTS 2120092  11/1983  United Kingdom ................ 297/313

Primary Examiner—Peter A. Aschenbrenner
Attorney, Agent, or Firm—Finnegan, Henderson, Farabow, Garrett & Dunner

[57] ABSTRACT

A vehicle seat adjustment apparatus includes a height control device and an inclination control device mounted on a seat frame for independently adjusting the height and inclination of a vehicle seat. A support base slidably supports a seat in a forward and a rearward direction. The seat frame means is mounted on the support base for supporting the seat. A rear portion of the seat is pivotally attached to the seat. A plurality of links pivotally connect the seat frame to the support base for raising and lowering the seat frame relative to the support base to adjust the height of the seat. The plurality of links include a control link, which is rotatably mounted on the seat frame. The height control device is connected to the control link and holds the plurality of links in a selected pivotal position. The height control device is operative to rotate the control link in a first direction to raise the seat and to rotate the control link opposite the first direction to lower the seat. The inclination control device includes a gear rotatably mounted on the seat frame and a member operatively connecting the gear and the forward portion of the seat, such that rotation of the gear pivots the seat about the pivot point along the rear portion of the seat to regulate the inclination of the seat.

4 Claims, 4 Drawing Sheets

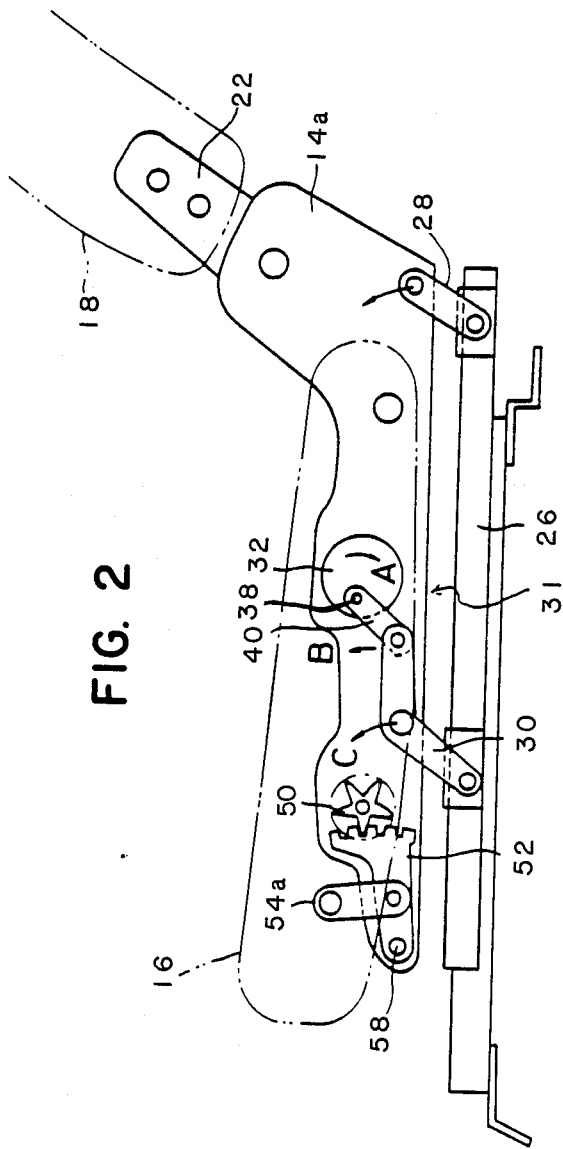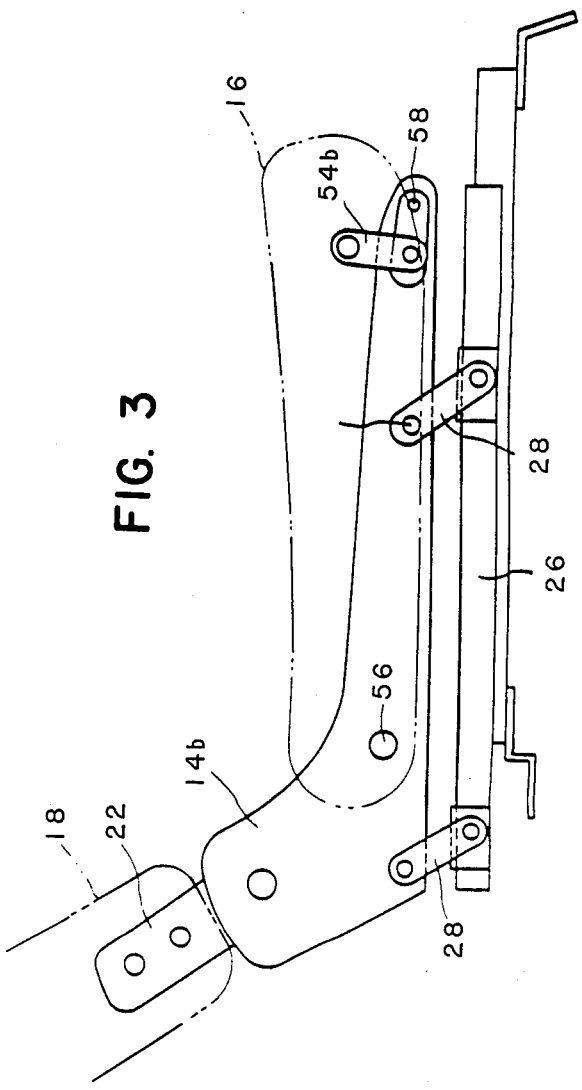

VEHICLE SEAT HEIGHT AND INCLINATION CONTROL APPARATUS

BACKGROUND OF THE INVENTION

The present invention relates to a vehicle seat control apparatus, and more particularly to an apparatus for selectively adjusting the height and inclination of vehicle seats.

In a conventional vehicle seat as shown in FIG. 6, a seat cushion 2 is supported on a seat frame 4 and a seatback 6 is supported by an seatback frame 8, which is pivotally connected to the seat frame 4. A headrest 10 is mounted on the seatback 6. The seat frame 4 is secured to a lower bracket 12 extending along the floor of the vehicle.

In this conventional seat, the seat cushion 2 is moved to a position shown by a dashed line for adjusting the inclination of a support surface provided by the seat cushion 2, while the seat reclining operation is controlled by changing the inclination of the seatback. Despite inclination of the seat cushion 2, the eye-level of a seated passenger essentially is unchanged, even when the seat cushion is moved to a position shown by the dashed line. Oftentimes, it is desirable to be able to regulate the height of the seat cushion 2, in order to control the seated passenger's field of vision depending on the individual's size, among other things.

Japanese Utility Opened Letter No. 60 (1985) - 16622 shows a related invention for a height control apparatus for a seat cushion. According to this related application, the eye-level of the seated passenger is adjusted to a suitable position by changing the height of the seat cushion relative to the floor. Typically, this height control apparatus produces a force on the back of the seated passenger each time the seat cushion is adjusted. Further, the operating force required to control the height of the seat cushion is substantial.

SUMMARY OF THE INVENTION

Accordingly, it is a primary object of this invention to provide a new and improved seat height control apparatus for vehicle seats which obviates the drawbacks of the mechanisms previously described.

Another object of the present invention is to provide an improved seat height contol apparatus for vehicle seats which can reliably adjusted without discomfort to the seated passenger.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, a vehicle seat adjustment apparatus includes height control means and inclination control means mounted on frame means for independently adjusting the height and inclination of a vehicle seat. Support means slidably support a seat in a forward and a rearward direction. Frame means is mounted on the support means for supporting the seat along substantially opposite sides thereof. The frame means includes a first frame and pivot means for pivotally connecting a rearward portion of the seat to the frame means. Link means pivotally connects the frame means to the support means for raising and lowering the frame means relative to the support means to adjust the height of the seat. The link means include a control link rotatably mounted on the first frame. The control link includes a first end and a second end, the first end being pivotally mounted on the support means.

According to the present invention, height control means is rotatably mounted on the first frame for holding the link means in a selected pivotal position. The height control means include adjustment means connected to the second end for selectively adjusting a rotational position of the control link relative to the first frame and for adjusting the pivotal position of the link means relative to the support means. The height control means is operative to rotate the control link in a first direction to raise the seat and to rotate the control link opposite the first direction to lower the seat.

According to the present invention, inclination control means is mounted on the frame means for adjusting the inclination of the seat relative to the support means. The inclination control means includes gear means rotatably mounted on the frame means and connection means which operatively connects the gear means and the forward portion of the seat, such that rotation of the gear means pivots the seat about the pivot means to regulate the inclination of the seat.

Preferably, the adjustment means for the seat height control apparatus includes a cam plate rotatably mounted on the first frame, a pin eccentrically disposed on the cam plate, a connecting member pivotally mounted on the pin and pivotally attached to the second end of the control link, and a control lever connected to the cam plate for rotation thereof. Alternatively, the ajustment means includes a gear rotatably mounted on the first frame, a gear rack disposed along the second end of the control link in meshed engagement with the gear, and a control lever connected to the cam plate for rotation thereof. In addition, a torsion spring may be attached to the link means to urge the link means to raise the seat. Further, the inclination control means may include a gear rotatably mounted on the first frame, a rack plate rotatably mounted on the first frame and having a toothed portion meshed with the gear, and an elongated member pivotally attached to the rack plate and the seat.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 2 is a side elevation view showing a lower bracket along one side of the seat depicted in FIG. 1;

FIG. 3 is a side elevation view similar to FIG. 2, showing a lower bracket on other side of the seat;

DETAILED DESCRIPTION OF THE PREFERRED EMBODIMENT

Reference will now be made to preferred embodiments of the invention, examples of which are illustrated in the accompanying drawings.

Figure 1:
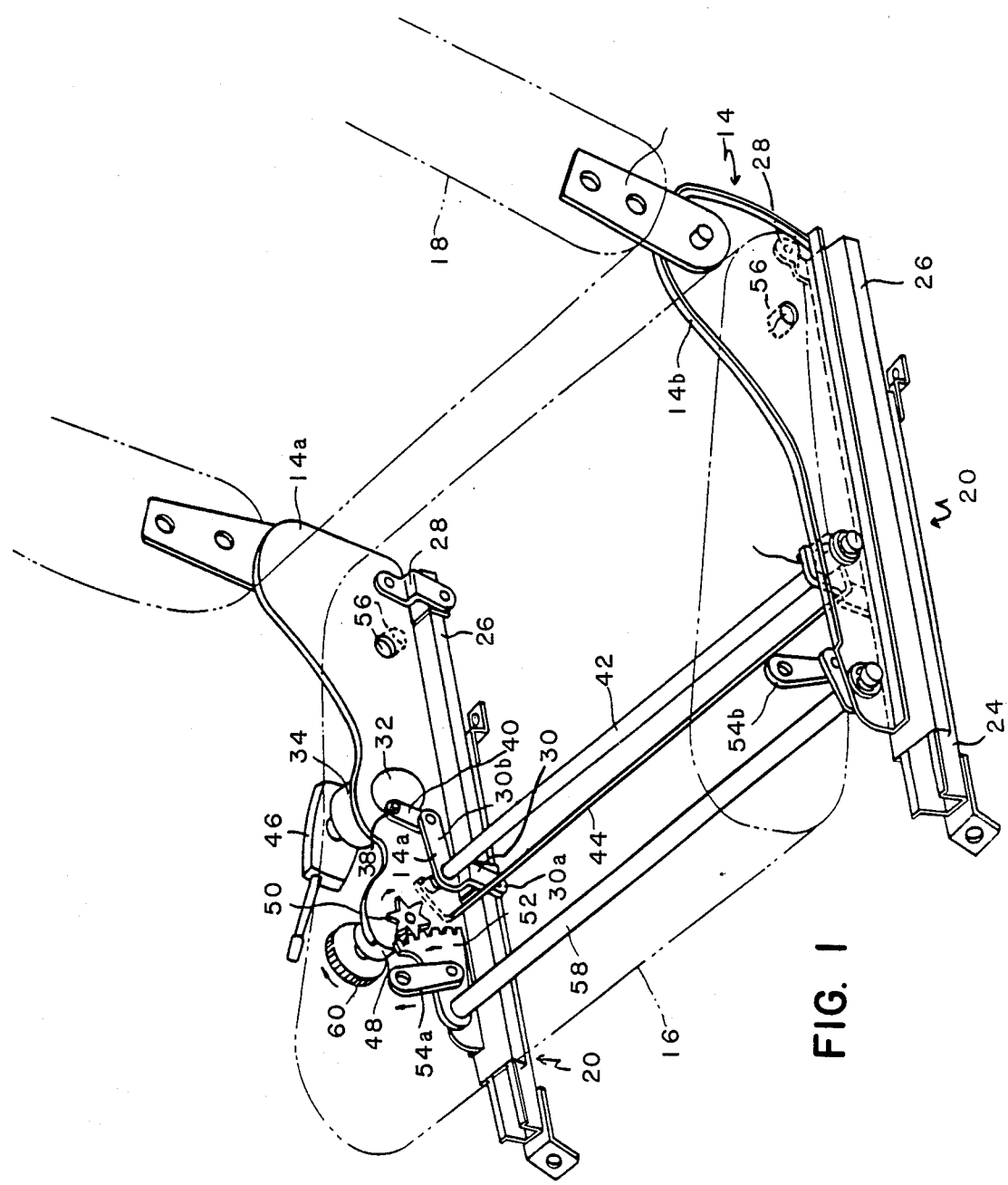
FIG. 1 is a perspective view showing a preferred embodiment of a vehicle seat control apparatus of the present invention.

As embodied herein, with reference to FIGS. 1, 2, and 3, support means 20 includes a pair of lower rails 24 and upper rails 26, the upper rails 26 being slidably mounted on the lower rails 24 for adjusting the seat cushion forward and rearward. The seat frame 14 for supporting the seat cushion 16 includes first and second frames 14a, 14b, which are connected to the upper rails 26 by link means, such as support links 28 and a control link 30. The link means are spaced forwardly and rearwardly along the upper rails 26 to support the seat frame 14.

According to the present invention, the control link 30 has a bell-crank shape and is rotatably mounted on the first frame 14a. A first end 30a is pivotally attached to the upper rails 26. A second end 30b of the control link 30 is connected to height control means having adjusting means generally referred to by the reference numeral 31, for adjusting a rotational position of the control link 30 relative to the first frame 14a and for adjusting a pivotal position of the link means relative to the support means 20. The adjusting means 31 includes a cam plate 32 of an output portion of a spring coupler 34 fixedly connected to the first frame. The cam plate 32 includes a pin 38 eccentrically disposed on the cam plate 32. An arm 40 is pivotally mounted on the pin 38 and pivotally attached to the second end 30b of the control link 30. The control link 30 is connected to a rod 42 extending between the first and second frames 14a, 14b.

According to the present invention, reference numeral 44 denotes a torsion spring which engages the link means for urging the upward movement of the seat frame 14. The spring coupler 34 is of a variety of well-known spring couplers and clutch brake mechanisms which may be used, such as described in allowed U.S. patent application Ser. No. 491,188 filed May 3, 1983. As such, description of the construction of the spring coupler 8 is not specifically described herein. A control lever 46 is connected to the input portion of the spring coupler 34. The control lever 46 rotates the control link 30 in a first direction to raise the seat frame 14; and also rotates the control link 30 opposite the first direction to lower the seat cushion 16.

According to the present invention, as broadly described and embodied herein, inclination control means is mounted on the frame means for adjusting the inclination of the seated support surface of the seat cushion 16 relative to the upper rails 24. The inclination control means includes another spring coupler 48. A rotatable gear 50 is engaged with a sector gear or rack plate 52 which is fixedly mounted on a rotatable rod 58. The gear plate 52 is connected to the seat cushion 16 via an elongated member or link 54a. The seat cushion 16 is pivotably supported on the seat frame 14 by pivot means, such as a pivot pin 56 or the like. The movement of the section gear 52 is transmitted to a link 54b via the rod 58. Further, the input portion of the spring coupler 48 is fixed to a dial 60. Thus, the gear 50 is rotated by the rotation of the dial 60 via the spring coupler 48 and the sector gear 52 is rotated about an axial center of the rod 58, which is supported between the first and second frames 14a, 14b. Accordingly, both links 54a, 54b are moved upward and downward and the seat cushion 16 is inclined about the pivot pin 56. As a result, the inclination of the seat surface of the seat cushion 16 is selectively controlled.

Figure 4:
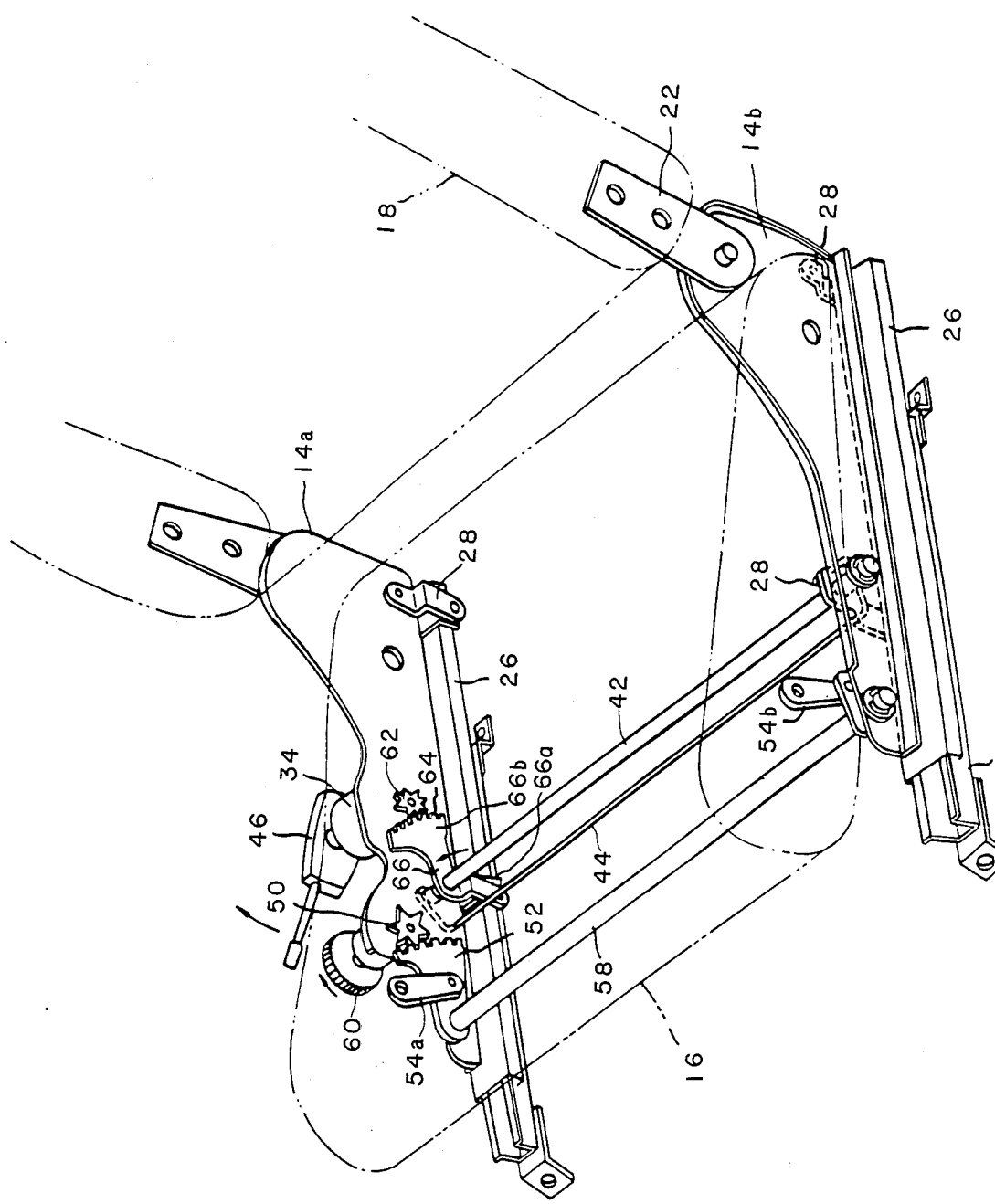
FIG. 4 is a perspective view showing another embodiment of a vehicle seat control apparatus of the present invention.

Another embodiment of the present invention is shown in FIG. 4. According to this embodiment, the adjustment means 31 includes a gear 62 is fixedly connected to an output portion of the spring coupler 34. The gear 62 is engaged with a sector gear or gear rack 64 disposed on the second end 66b of a control ink 66. The first end 66a of the control link 66 is pivotably supported on one of upper rails 26.

Figure 5:
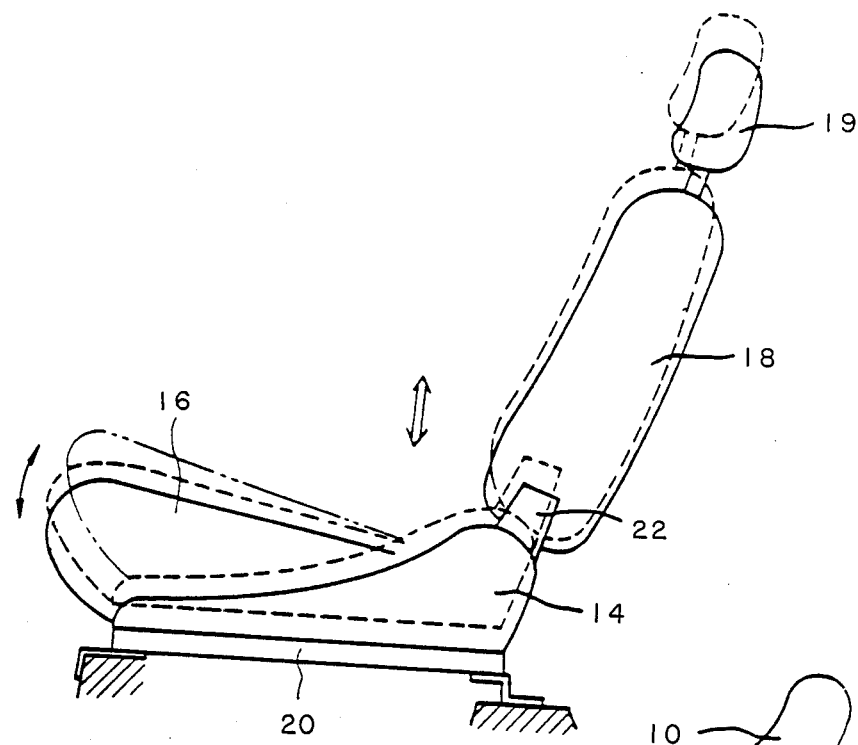
FIG. 5 is a side elevation view illustrating the movement of the seat in dashed lines in response to operation of the vehicle seat control apparatus of the present invention.
Figure 6:
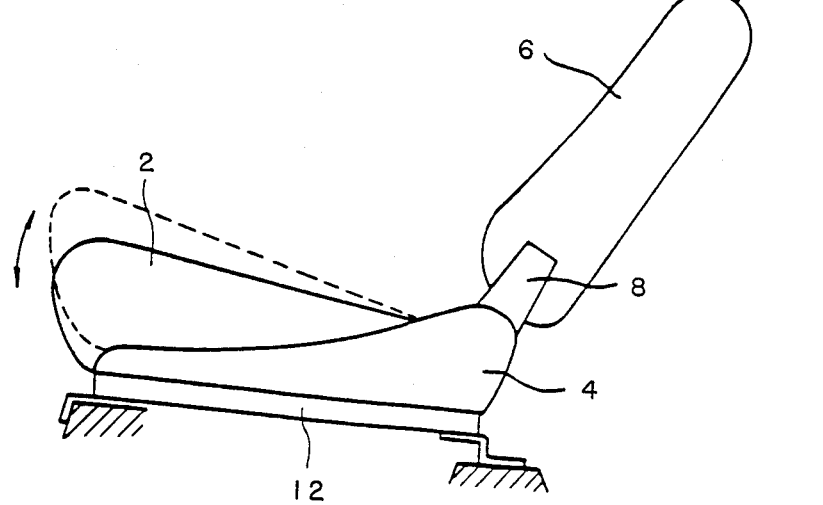
FIG. 6 is a side elevation view illustrating the movement of the seat in dashed lines in response to operation of a conventional vehicle seat control apparatus.

The operation of the vehicle seat adjustment apparatus of the present invention will now be described. In the embodiment shown in FIGS. 1-3, the control lever 46 is pulled up and the cam plate 32 is rotated in the direction of arrow A through a spring coupler 34 (FIG. 2) to move the arm 40 and the second end 30b of the control link 30 in the direction of arrow B. Accordingly, the control link 30 is generally rotated in the direction of arrow C around the pivotal connection of the control link on the upper rails 26. The rotation of the control link 30 is transmitted via the rod 42 and the seat frame 14 to pivot the support links 28 upward, together with the spring force of the tension spring 44. As a result, the seat cushion 2 and the seatback 4 are moved to a raised position shown by a dashed line as shown in FIG. 5. The control lever 46 is moved downward in order to lower the seat cushion 2, and then the reverse movement of the adjustment means and the link means occurs. The embodiment shown in FIG. 4 operates similarly.

According to the present invention the height and inclination of the seat cushion are independently controlled, so that a seated passenger can optimally position the seat to accommodate his own requirements. Therefore, when a preferred height is selected, the dial 60 may be rotated to adjust sector gear 60 to modify the inclination of the seated surface.

Thus, as shown in FIG. 5, the present invention solves the problems described in the Background of the invention by a seat height control apparatus having a seat frame 14 which is raised and lowered relative to the floor of the vehicle. The seat frame 14 also supports an inclination control mechanism for adjusting the inclination of the seat cushion independent of the operation of the height control apparatus. As such, the seat cushion 16, seatback 18, and headrest 19 are movable upward and downward without changing the relative relationship therebetween.

The seat height control apparatus also includes link means. The seat frame 14 and support means 20 are connected by the link means, which is pivoted relative to the support means 20. When the link means connecting the seat frame 14 and the support means 20 is pivoted, the seat frame 14 is raised and lowered relative to the floor of the vehicle. For example, when the link means is raised, the seat frame 14 is raised and a seatback frame 22 connected to the seat frame 14 also is raised a corresponding amount. Thus, the seat cushion 16 and the seatback 18 are moved to the position shown by dashed lines in FIG. 5.

It will be apparent to those skilled in the art that modifications and variations can be made in the seat adjustment apparatus of the present invention. It is intended that the present invention cover the modification and variations provided that they come within the scope of the appended claims and their equivalents.

What is claimed is:

1. A vehicle seat adjustment apparatus, comprising:
   a seat;
   support means mounted on a vehicle body;
   frame means mounted on said support means for supporting said seat along substantially opposite sides thereof, said frame means including a first frame and pivot means for pivotally connecting a rearward portion of the seat to said frame means;
   link means pivotally connecting said frame means to said support means for raising and lowering said frame means relative to said support means to adjust the height of said seat, said link means including a control link rotatably attached to said first frame and at least one support link, said control link being pivotally attached to said support means;
   height control means for holding said link means in a selected pivotal position, said height control means being operative to rotate said control link in a first direction to raise said seat and to rotate said control link opposite said first direction to lower said seat, said height control means including adjustment means for selectively adjusting a rotational position of said control link relative to said support means, a cam plate rotatably mounted on said first frame, a pin eccentrically disposed on said cam plate, a connecting arm pivotally mounted on said pin and pivotally attached to said control link, and a control lever connected to said cam plate for rotation thereof; and
   inclination control means mounted on said frame means for adjusting the inclination of said seat relative to said support means, said inclination control means including rotatable means rotatably mounted on said frame means and connection means operatively connecting said rotatable means and a forward portion of the seat, whereby rotation of said rotatable means pivots said seat about said pivot means to regulate the inclination of said seat.

2. The vehicle seat adjustment apparatus as defined in claim 1, wherein said rotatable means includes a gear and a rack plate rotatably mounted on said first frame, said rack plate having a toothed portion meshed with said gear, and wherein said connection means is an elongated member pivotally attached to said rack plate and said seat.

3. The vehicle seat adjustment apparatus as defined in claim 1, wherein said height control means further includes a torsion spring attached to said link means urging said link means to raise the seat.

4. A vehicle seat adjustment apparatus, comprising:
   a seat;
   support means for slidably supporting the seat in a forward and a rearward direction, said support means including a fixed lower rail and an upper rail slidably mounted on said lower rail;
   frame means adapted to be mounted on said upper rail for supporting said seat along substantially opposite sides thereof, said frame means including a first frame and pivot means for pivotally connecting a rearward portion of said seat to said frame means;
   a seatback pivotally attached to said frame means;
   link means pivotally connecting said frame means to said support means for raising and lowering said frame means relative to said support means to adjust the height of the seat, said link means including a control link rotatably attached to said first frame and at least one support link, said control link having a first end and a second end, said first end being pivotally attached to said support means;
   height control means rotatably mounted on said first frame for holding said link means in a selected pivotal position, said control means including adjustment means connected to said second end for selectively adjusting a rotational position of said control link relative to said first frame and the pivotal position of said at least one support link and said control link relative to said support means, said height control means being operative to rotate said control link in a first direction to raise said seat and to rotate said control link opposite said first direction to lower said seat, said adjustment means including a cam plate rotatably mounted on said first frame and a connecting arm pivotally connected to said second end and to said cam plate; and
   inclination control means mounted on said frame means for adjusting the inclination of said seat relative to said support means, said inclination control means including gear means rotatably mounted on said frame means and connection means operatively connecting said gear means and a forward portion of the seat, whereby rotation of said gear means pivots said seat about said pivot means to regulate the inclination of said seat.

* * * * *